(12) United States Patent
Wessner et al.

(10) Patent No.: US 9,707,950 B2
(45) Date of Patent: Jul. 18, 2017

(54) SYSTEM AND METHOD FOR MEASUREMENT AND EVALUATION OF BRAKE PEDAL PERFORMANCE

(71) Applicant: Bayerische Motoren Werke Aktiengesellschaft, Munich (DE)

(72) Inventors: Matthew Wessner, Marietta, GA (US); Cristian Zucchetti, Greenville, SC (US)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 559 days.

(21) Appl. No.: 14/279,958

(22) Filed: May 16, 2014

(65) Prior Publication Data
US 2015/0330853 A1   Nov. 19, 2015

(51) Int. Cl.
| | |
|---|---|
| *G01L 5/28* | (2006.01) |
| *B60T 17/22* | (2006.01) |
| *B60T 7/04* | (2006.01) |
| *B60T 7/06* | (2006.01) |

(52) U.S. Cl.
CPC .............. *B60T 17/22* (2013.01); *B60T 7/042* (2013.01); *B60T 7/06* (2013.01); *G01L 5/28* (2013.01); *B60T 2220/04* (2013.01)

(58) Field of Classification Search
CPC ..... G01L 5/28; B60L 7/10; B60L 7/24; B60T 1/10; B60T 13/662; B60T 8/172; B60T 2220/04; B60T 7/042; B60T 8/1755; B60T 2270/604; B60W 10/184
USPC ............... 702/182; 701/22, 29.1, 48, 67, 70; 477/175, 203
See application file for complete search history.

(56) References Cited

U.S. PATENT DOCUMENTS

| | | | | |
|---|---|---|---|---|
| 4,678,243 A | * | 7/1987 | Leiber .................. | B60T 8/3275 303/113.4 |
| 5,954,407 A | * | 9/1999 | Schramm ............... | B60T 7/042 303/113.4 |

(Continued)

FOREIGN PATENT DOCUMENTS

| | | |
|---|---|---|
| DE | 195 10 525 A1 | 9/1996 |
| DE | 197 37 142 A1 | 3/1999 |

(Continued)

OTHER PUBLICATIONS

German-language Office Action dated Jan. 8, 2015 (Eight (8) pages).

*Primary Examiner* — Carol S Tsai
(74) *Attorney, Agent, or Firm* — Crowell & Moring LLP

(57) ABSTRACT

Linear brake pedal travel measurements are provided using a diagnostic unit with at least two linear measurement devices. The at least two linear measurement devices are offset in at least a vertical direction from a face of the brake pedal lever, and therefore directly measure non-linear pedal travel values. Thus, in certain embodiments, the system is further configured to convert the non-linear pedal travel measurements received from each of the at least two linear measurement devices to a linear brake pedal travel value corresponding to an operated position of the brake pedal lever. The resulting linear brake pedal travel information may then be used to evaluate brake pedal performance or measure customer brake feeling in an objective and reproducible way.

20 Claims, 10 Drawing Sheets

(56) References Cited

U.S. PATENT DOCUMENTS

| | | | | |
|---|---|---|---|---|
| 6,007,160 | A * | 12/1999 | Lubbers | B60T 7/042 188/358 |
| 6,226,586 | B1 * | 5/2001 | Luckevich | B60T 7/042 188/72.1 |
| 6,409,288 | B2 * | 6/2002 | Yoshida | B60T 7/042 303/113.4 |
| 6,702,718 | B2 * | 3/2004 | Tani | F02D 41/042 477/203 |
| 6,945,610 | B1 * | 9/2005 | Mizutani | B60T 8/3275 303/11 |
| 6,951,528 | B2 * | 10/2005 | Ewinger | B60T 7/045 192/219.4 |
| 7,054,732 | B2 * | 5/2006 | Rieger | F16D 48/06 477/166 |
| 8,160,768 | B2 * | 4/2012 | Dang Van Nhan | B60T 7/042 701/29.1 |
| 8,255,103 | B2 * | 8/2012 | Karnjate | B60T 7/042 701/22 |
| 8,620,548 | B2 * | 12/2013 | Shibasaki | B60T 8/885 303/20 |
| 8,634,990 | B2 * | 1/2014 | Bourqui | B60L 3/0023 307/18 |
| 9,205,818 | B2 * | 12/2015 | Szell | B60T 7/042 |
| 9,260,087 | B2 * | 2/2016 | Aldrich, III | B60L 7/10 |
| 2002/0103055 | A1 * | 8/2002 | Tani | F02D 41/042 477/115 |
| 2008/0018140 | A1 * | 1/2008 | Reutter | B60R 21/0134 296/221 |
| 2009/0099744 | A1 * | 4/2009 | Karnjate | B60T 8/3275 701/70 |
| 2009/0242285 | A1 * | 10/2009 | Whetstone, Jr. | B62D 49/0692 180/19.2 |
| 2012/0078481 | A1 * | 3/2012 | Aldrich, III | B60L 7/10 701/70 |

FOREIGN PATENT DOCUMENTS

| | | |
|---|---|---|
| DE | 101 23 730 A1 | 3/2002 |
| DE | 101 45 437 A1 | 6/2002 |
| DE | 10 2010 031 209 A1 | 12/2011 |

\* cited by examiner

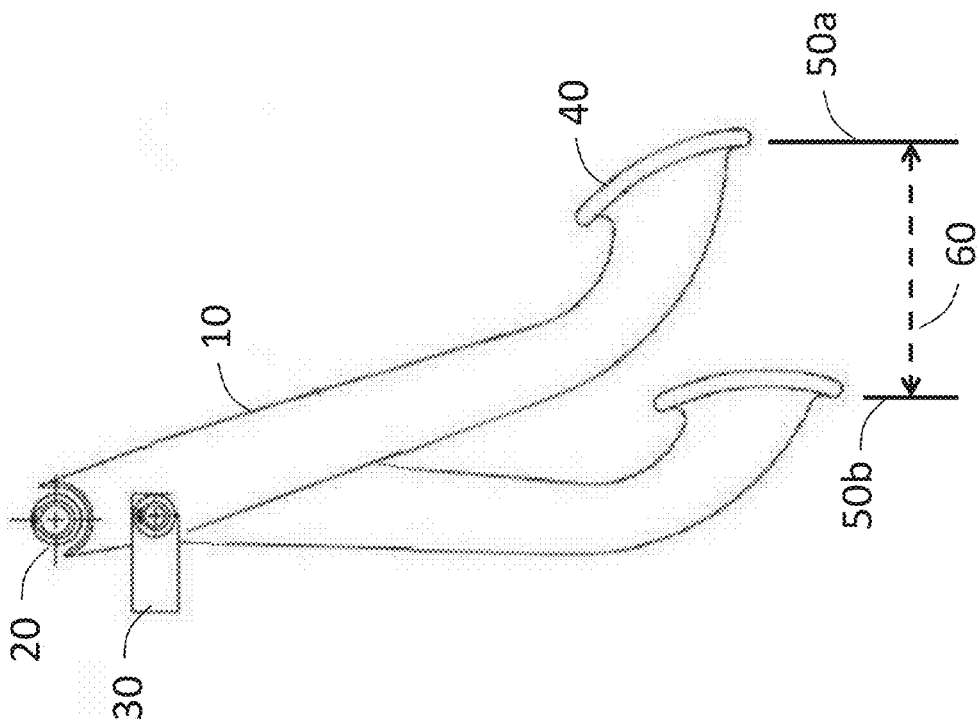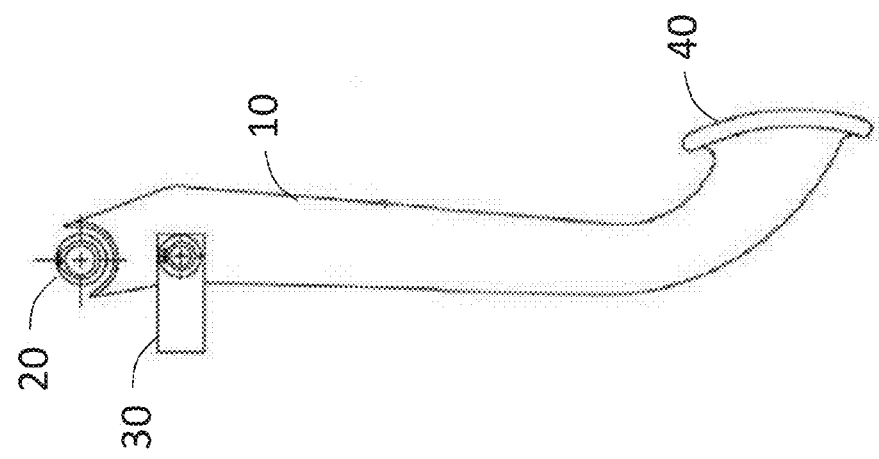

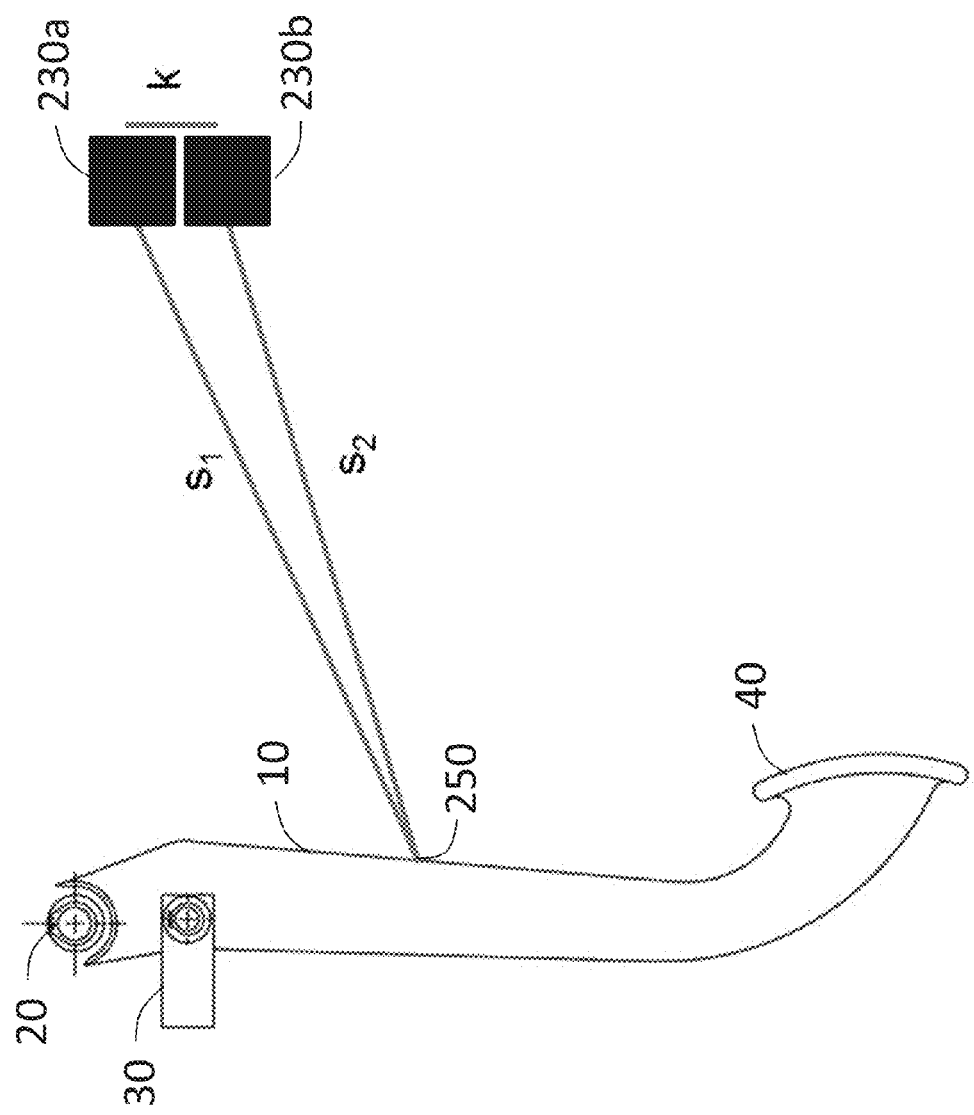

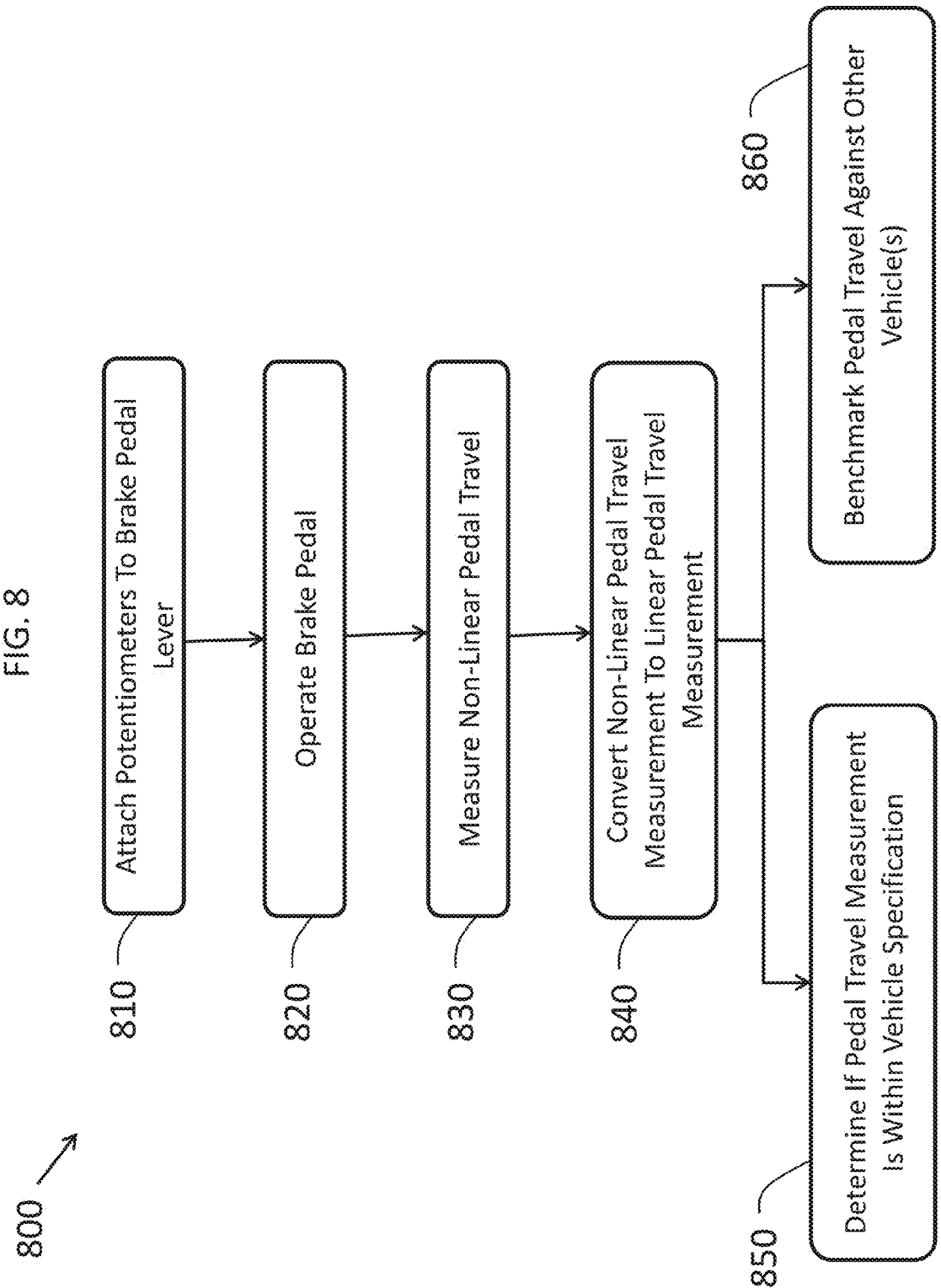

SYSTEM AND METHOD FOR MEASUREMENT AND EVALUATION OF BRAKE PEDAL PERFORMANCE

FIELD OF THE INVENTION

The present invention relates in general to a system and method for measurement and evaluation of brake pedal feel and performance and, in particular, to diagnosing brake pedal feel and performance based on sensing non-linear pedal travel information.

BACKGROUND OF THE INVENTION

It is sometimes necessary to diagnose and test brake pedal feel and performance. For example, vehicle operators may sense that the brake pedal is providing either too little or too much resistance when operating the brake pedal. Since these conditions can indicate that the brakes are not operating in an optimal manner, it is important to be able to diagnose the condition in order to further be able to repair the system. However, since the degree of "softness" of a brake is subjective in nature, it is necessary to further quantify the "feel" of the brake pedal in order to properly diagnose whether or not the pedal is in fact operating properly.

According to current practices, measuring brake pedal performance requires measuring the linear travel of the brake pedal travel. However, this has proved to be a challenge. One option is to use a string potentiometer which was placed directly in-plane with the face of the brake pedal, just to the side of where the driver applies their foot. This directly measures the travel of the brake pedal linearly, but unfortunately interferes with normal driving as the mounting fixture must be located in the driver's foot well in order to position the string potentiometer directly in front of the brake pedal. Moreover, optical measurement devices are similarly problematic due to the requirement that they also be placed directly in-line with the brake pedal arm or face.

Thus, there is a need for a system and method of measuring the linear travel of the brake pedal travel in such a way that does not interfere with the driver's access to the brake or other pedals or otherwise disturb the operation of the pedal (e.g., maximum travel, foot access to pedal, rate of application, free return of the pedal, etc.) in order to facilitate brake pedal measurements while driving normally. Additionally, there is a need for a system and method of measuring the linear component of the brake pedal travel in a universal manner that is applicable to different vehicle sizes and configurations.

BRIEF SUMMARY OF THE INVENTION

Disclosed and claimed herein are systems and methods for the measurement and evaluation of brake pedal performance for a vehicle. In one embodiments, the system comprising a diagnostic unit having a processor coupled to a memory. The system further includes at least two linear measurement devices in electrical communication with the diagnostic unit, wherein the at least two linear measurement devices are offset in at least a vertical direction from a face of the brake pedal lever. In this embodiment, the at least two linear measurement devices are each configured to provide, in response to an operation of the brake pedal lever from an initial position to a first operated position, a signal corresponding to a non-linear pedal travel measurement of the brake pedal lever resulting from said operation. The processor is further configured to convert the non-linear pedal travel measurements received from each of the at least two linear measurement devices to a linear brake pedal travel value corresponding to the first operated position.

Other aspects, features, and techniques of the invention will be apparent to one skilled in the relevant art in view of the following detailed description of the invention.

BRIEF DESCRIPTION OF THE DRAWINGS

The features, objects, and advantages of the present invention will become more apparent from the detailed description set forth below when taken in conjunction with the drawings in which like reference characters identify correspondingly throughout and wherein:

FIGS. 1A-1B depicts exemplary brake pedal assemblies with which the principles of the invention may be used;

FIG. 3 depicts another view of the two-string embodiment of FIG. 2A;

FIG. 8 depicts one embodiment of a process for carrying out one or more aspects of the invention.

DETAILED DESCRIPTION OF EXEMPLARY EMBODIMENTS

Overview of the Disclosure

Figure 2A:
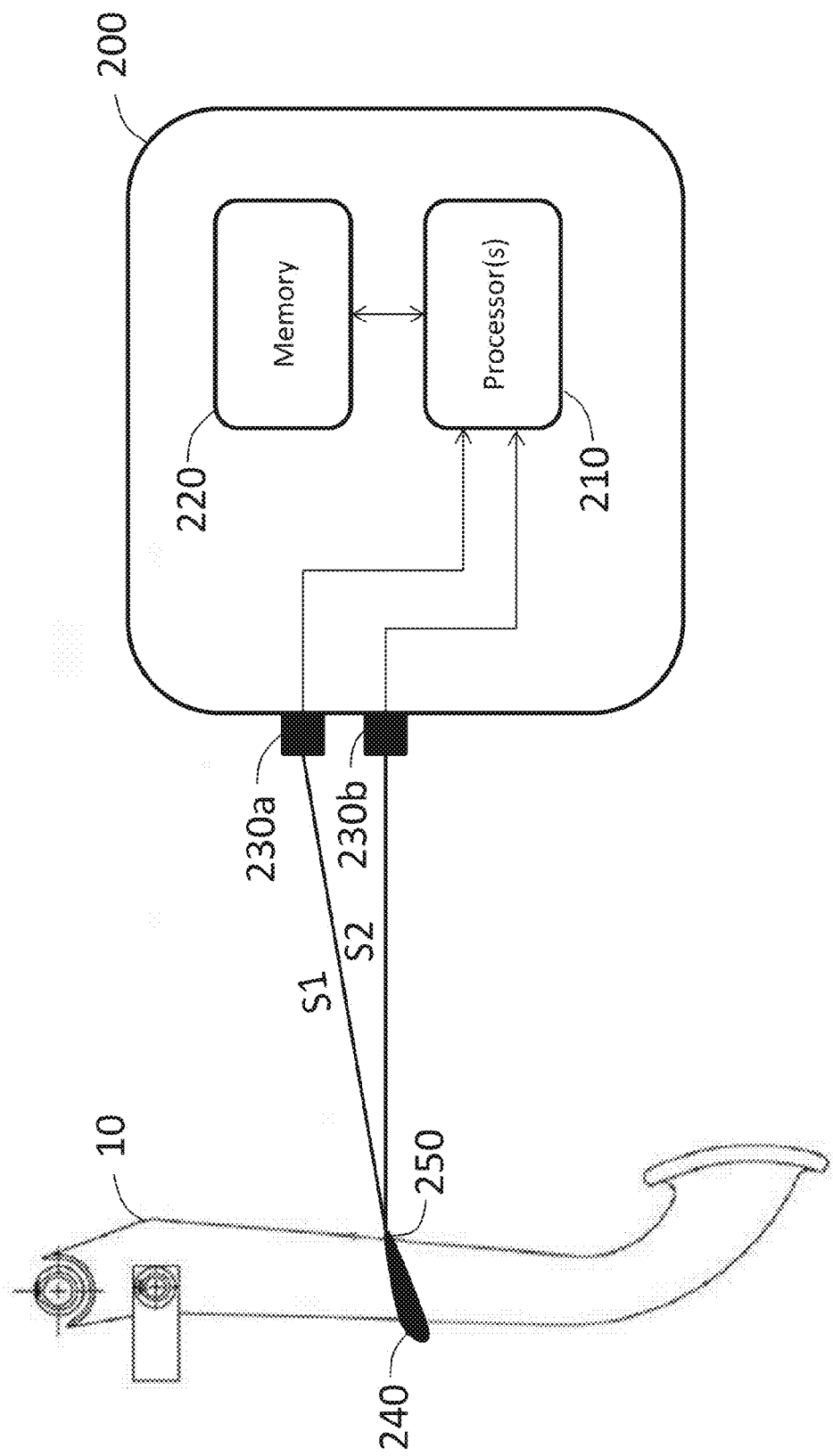
FIGS. 2A-2B depict two and three string embodiments, respectively, of a system configured to implement one or more aspects of the invention.

One aspect of the disclosure relates to providing a system and method of measuring the linear travel of the brake pedal travel in such a way that does not interfere with the driver's access to the brake or other pedals or otherwise disturb the operation of the pedal (e.g., maximum travel, foot access to pedal, rate of application, free return of the pedal, etc.) in order to facilitate brake pedal measurements while driving normally. Preferably, the system also enables measuring the linear component of the brake pedal travel in a universal manner such that it can be used interchangeably with different vehicle sizes and configurations.

In one embodiment, the system includes a diagnostic unit to which at least two linear measurement devices are connected. The linear measurement devices may comprise string potentiometers (a.k.a. draw wire transducer, cable extension transducer, etc.), linear potentiometers, laser distance sensors, Hall Effect sensors, ultrasonic distance sensors, etc. In the case of string potentiometers, for example, such devices may be coupled to a brake pedal lever of the vehicle using a corresponding string extending from each of the respective potentiometers to a common point of termination in a vicinity of the brake pedal lever. In a preferred embodiment, when using two linear measurement devices, such devices may be offset in a vertical direction from a face of the brake pedal lever, and when using three linear measurement devices, such devices may be offset in both the vertical and horizontal direction from a face of the brake pedal lever.

As will be described in more detail below, the linear measurement devices may be configured to provide signals to the diagnostic unit corresponding to non-linear pedal travel measurements of the brake pedal lever resulting from driver operation of the brake pedal. The system may be then further configured to convert the non-linear pedal travel measurements received from each of the at least two string potentiometers to a linear brake pedal travel value corresponding to an operated position of the brake pedal lever.

While much of the following disclosure is made with respect to the use of string potentiometers, it should be appreciated that the linear measurement devices may instead be linear potentiometers, laser distance sensors, Hall Effect sensors, ultrasonic distance sensors, etc., and that the teachings below are equally applicable to such other types of linear measurement devices as well.

As used herein, the terms "a" or "an" shall mean one or more than one. The term "plurality" shall mean two or more than two. The term "another" is defined as a second or more. The terms "including" and/or "having" are open ended (e.g., comprising). The term "or" as used herein is to be interpreted as inclusive or meaning any one or any combination. Therefore, A, B or C means any of the following: A; B; C; A and B; A and C; B and C; A, B and C. An exception to this definition will occur only when a combination of elements, functions, steps or acts are in some way inherently mutually exclusive. Reference throughout this document to "one embodiment", "certain embodiments", "an embodiment" or similar term means that a particular feature, structure, or characteristic described in connection with the embodiment is included in at least one embodiment of the present invention. Thus, the appearances of such phrases in various places throughout this specification are not necessarily all referring to the same embodiment. Furthermore, the particular features, structures, or characteristics may be combined in any suitable manner on one or more embodiments without limitation.

In accordance with the practices of persons skilled in the art of computer programming, the invention is described below with reference to operations that are performed by a computer system or a like electronic system. Such operations are sometimes referred to as being computer-executed. It will be appreciated that operations that are symbolically represented include the manipulation by a processor, such as a central processing unit, of electrical signals representing data bits and the maintenance of data bits at memory locations, such as in system memory, as well as other processing of signals. The memory locations where data bits are maintained are physical locations that have particular electrical, magnetic, optical, or organic properties corresponding to the data bits.

When implemented in software, the elements of the invention are essentially the code segments to perform the necessary tasks. The code segments can be stored in a processor readable medium, which may include any medium that can store information. Examples of the processor readable mediums include an electronic circuit, a semiconductor memory device, a read-only memory (ROM), a flash memory or other non-volatile memory, a floppy diskette, a CD-ROM, an optical disk, a hard disk, etc.

DETAILED DESCRIPTION

Brake pedal diagnostics are performed when, for example, there has been a customer complaint regarding the pedal "feel" or braking performance of a vehicle. Brake pedal performance may also be evaluated in connection with benchmarking efforts against comparison vehicles.

In order to measure brake pedal performance, various measurement devices and instrumentation must be used. In particular, linear pedal travel, brake line pressure, driver-applied pedal force and longitudinal vehicle deceleration are each separately measured and used to evaluate the performance of a given vehicle's braking system. Based on these measurements, data tables and graphs are generated and evaluated against expected performance specifications and/or compared to other vehicles for benchmarking purposes.

With respect to brake line pressure, the measurement process is carried out by measuring the pressure in the brake lines after the brake master cylinder and brake booster has been actuated. Pressure can be measured with an in-line pressure sensor or simulated. Moreover, digital brake line pressure signal may be available diagnostically (e.g., via OBD-II).

Driver-applied pedal force may be measured from the force applied to the brake pedal pad by the driver's foot using, for example, a force gauge or load cell affixed to the face of the brake pedal pad.

Longitudinal vehicle deceleration may be measured by recording the rate at which vehicle speed decreases using, for example, an accelerometer situated at the vehicle's center of gravity. Moreover, a vehicle longitudinal deceleration signal may be available diagnostically (e.g., via electronic control units over electric bus systems).

Measurement of linear pedal travel requires a determination of the pedal's linear travel in the plane of pedal rotation. The measurement process has relied upon the use of linear measurement devices, whether physical or optical, situated directly in-line with the brake pedal pad. However, one aspect of the invention is to relax the constraint that the measurement device be directly in-line with the pedal travel in order to significantly reduce the amount of interfere caused between the driver and the brake pedal, and to otherwise minimize disturbance of pedal operation thereby facilitating brake pedal measurements while driving normally. To that end, the following disclosure describes how linear measurement devices, such as string potentiometers, may be installed in a non-linear orientation (i.e., not in-line with the face of the pedal plate), yet can be used to determine an amount of linear pedal travel, as required by the brake pedal diagnostic process.

In order to describe the principles of the invention, an exemplary brake pedal assembly of a vehicle that may be used in connection with the invention is described with respect to FIGS. 1A-1B. It should be appreciated that a wide range of brake pedal assemblies may be used in connection with the invention disclosed herein, and that FIGS. 1A-1B depict only an exemplary brake pedal assembly with which the invention may be used.

Referring first to FIG. 1A, the brake pedal assembly comprises a brake pedal lever 10 that is hinged at an upper end to a chassis of the vehicle (not illustrated) by way of a support bearing 20 and, thus, can be pivoted about a pivot axis, which extends perpendicularly to the drawing plane through the support bearing 20. A pedal plate 40 is attached in a conventional manner to the free other end of the brake pedal lever 10. The driver of the vehicle operates the brake pedal lever 10, which is shown here in an already operated position, by way of the application of force to the pedal plate 40. When force is applied to the pedal plate 40, thereby causing the brake pedal lever 10 to travel from an initial rest position to an operated position, a pressure rod 30 is caused to correspondingly move and act upon a brake cylinder (not shown), as is generally known in field of art.

Referring now to FIG. 1B, depicted here is the same brake pedal assembly of FIG. 1, except in this instance the initial position 50*a* and the operated position 50*b* are shown as defining a linear brake pedal travel 60. As noted above, measuring brake pedal performance requires a measurement of this linear brake pedal travel 60. However, as noted above heretofore diagnostic equipment has been restricted to being placed directly in-line with the face of the pedal plate 40 in order to be able to accurate measure the linear brake pedal travel 60.

In view of the significant impairments brought about by placing diagnostic equipment in-line with the face of the pedal plate 40, the present disclosure provides a novel system and method for determining linear pedal travel using a diagnostic unit that need not be located in the plane of pedal rotation and in-line with the face of the pedal plate. The method is carried out using a system which includes a diagnostic unit, such as the diagnostic unit 200 of FIGS. 2A-2B. Diagnostic unit 200 comprises a processor unit 210 coupled to a memory 220, where the processor unit 210 should be interpreted broadly to include one or more processors, controllers or the like, and memory 220 may comprise read-only memory (ROM), random access memory (RAM) or any combination thereof capable of storing processor executable instructions.

With respect to FIG. 2A, the diagnostic unit 200 further comprises a first string potentiometer 230*a* and a second string potentiometer 230*b*, which are each in electrical communication with processor 210. In certain embodiments, the string potentiometers 230*a*, 230*b* are electrical devices that change the resistance applied to an input voltage based on the position of a drawn string, such that the resulting output voltage may be associated with the distance that the string is extended.

Figure 2B:
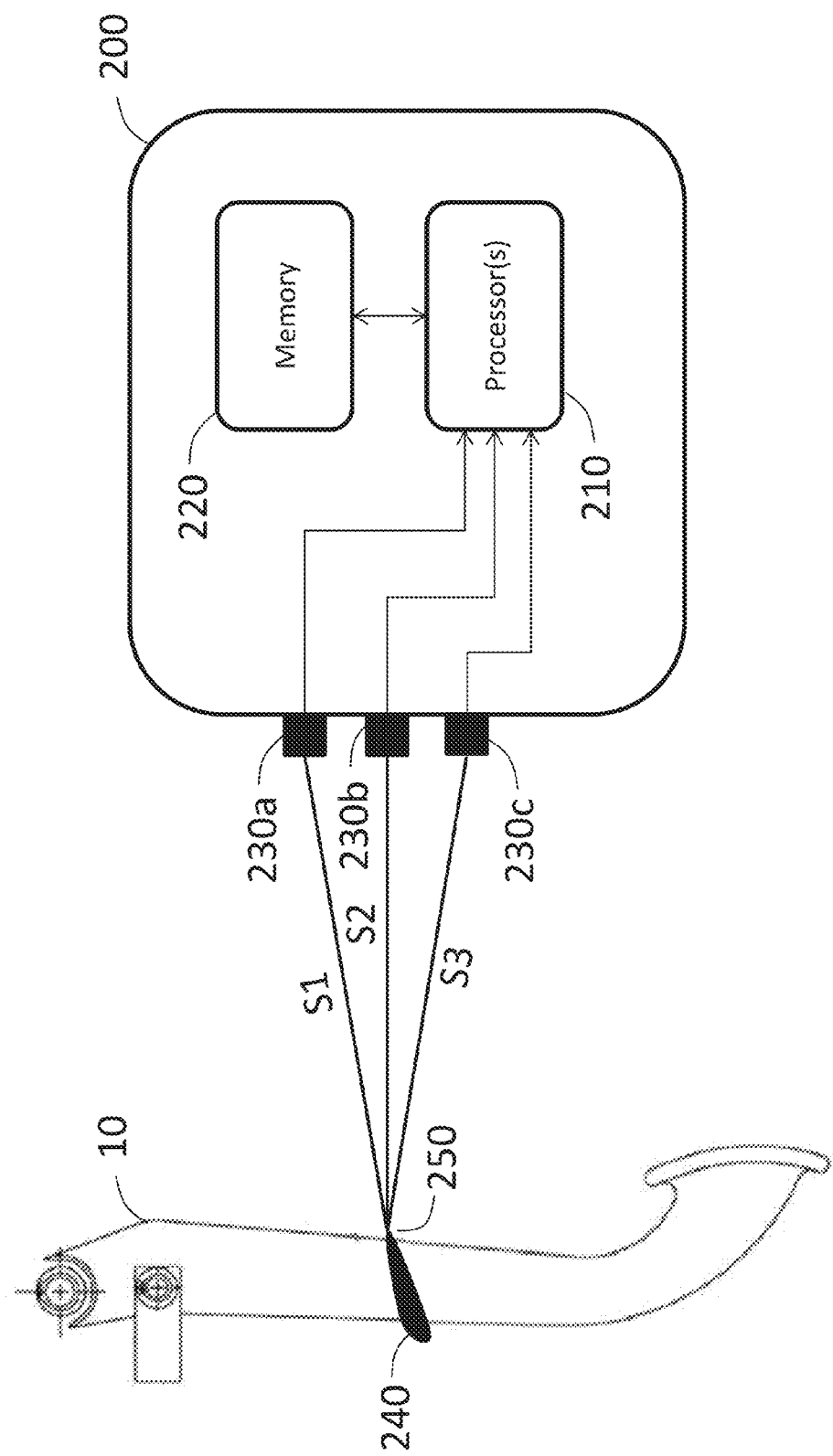

As shown, each of the first and second potentiometers 230*a*, 230*b* have a corresponding string S1, S2 that connects to or otherwise engages the brake pedal lever 10. In the embodiment of FIGS. 2A-2B, the strings S1, S2 of the potentiometers are shown as being connected to the brake pedal lever 10 using a connector 240, which may be in the form of a U-shaped connector extending around the back or opposite side of the brake pedal lever 10. In other embodiments, the connector 240 may be a magnet. It should be appreciated that the principles of the invention do not limit the precise means by which the strings S1, S2 are connected to the brake pedal lever 10, so long as they terminate at substantially the same point 250 along or in the vicinity of the brake pedal lever 10.

The system of FIG. 2A functions such that, as the brake pedal lever 10 is operated, the strings S1, S2 of the potentiometers are extended, the degree of which is detectable by the corresponding potentiometers 230*a*, 230*b*, which in turn provide a signal to processor 210 representative of the amount or degree to which the strings S1, S2 were extended as a result of such brake pedal operation.

Since one aspect of the invention is to enable the determination of the linear travel of a brake pedal, but without requiring the measurement device to be positioned within the plane of pedal rotation and in-line with the face of the pedal plate, the placement of the diagnostic unit 200 (in particular, its potentiometers 230*a*, 230*b*) is preferably offset from the face of the pedal plate and outside of the plane of pedal rotation. As will be described in greater detail below, the diagnostic unit 200 may be positioned in a vertically offset manner with respect to the face of the pedal plate. Moreover, unlike prior art approaches, the diagnostic unit 200 may be located at virtually any distance away from the brake pedal, and in a vertically offset orientation, so long at the strings of the potentiometer are affixed to substantially the same point 250 along or in the vicinity of the brake pedal lever 10.

Referring now to FIG. 2B, depicted is another embodiment of the diagnostic unit 200 of FIG. 2A, although in this case having a 3-string configuration in which a first string potentiometer 230*a*, a second string potentiometer 230*b*, and a third string potentiometer 230*c* are each in electrical communication with processor 210.

And as with FIG. 2A, each of the first, second and third potentiometers 230*a*, 230*b*, 230*c* have a corresponding string S1, S2, S3 that connects to or otherwise engages the brake pedal lever 10 again using connector 240. As noted above, connector 240 may be the form of a U-shaped connector, may be a magnet, etc., so long as the strings S1, S2, S3 terminate on or near the brake pedal lever 10 at substantially the same point 250.

The system of FIG. 2B functions in the same manner described above with respect to FIG. 2A whereby, as the brake pedal lever 10 is operated, the strings S1, S2, S3 of the potentiometers are extended, the degree of which is detectable by the corresponding potentiometers 230*a*, 230*b*, 230*c* which in turn provide a signal to processor 210 representative of the amount or degree to which the strings S1, S2, S3 were extended as a result of such brake pedal operation.

While the two-string embodiment of FIG. 2A allowed the diagnostic unit 200 to be positioned in a vertically offset manner with respect to the face of the pedal plate, the three-string embodiment of FIG. 2B provides for another degree of freedom with respect to the placement of the diagnostic unit 200. In particular, the diagnostic unit 200 may be positioned anywhere along the driver-side floorboard, on the car seat, attached to the underside of the dashboard (kick board), etc. Unlike many optical solutions, the diagnostic unit 200 may be located at virtually any distance away from the brake pedal, and at any angle or orientation to the brake pedal (i.e., offset from the face of the pedal plate in both the horizontal and vertical directions), so long at the strings of the potentiometer are affixed to substantially the same point along the brake pedal lever 10. As such, the system of FIGS. 2A-2B enables brake pedal travel to be measured in such a way that does not interfere with the driver's access to the brake or other pedals or otherwise disturb the operation of the pedal (e.g., maximum travel, foot access to pedal, rate of application, free return of the pedal, etc.) in order to facilitate brake pedal measurements while driving normally. Additionally, the system can be used in a universal manner that is applicable to different vehicle sizes and configurations since the diagnostic unit 200 may be located at virtually any distance away from the brake pedal, and at any angle or orientation with respect to the brake pedal.

With respect to both of the embodiments of FIGS. 2A and 2B, it should further be appreciated that the potentiometers (230*a*, 230*b*, 230*c*) need not be integrated with the diagnostic unit 200, but instead may be fixable at separate locations apart from each other (separated by a distance k), as well as apart from the portion of the diagnostic unit 200 actually housing the processor 210 and/or memory 220. In other words, the invention should not be limited to requiring the potentiometers to be integrated into a single housing, along with the processor 210 and/or memory 220.

Since the potentiometers 230*a*, 230*b*, 230*c* are offset from the face of the pedal plate in the vertical and/or the horizontal direction, the resulting brake pedal travel measurements are non-linear. However, industry standard requires that brake diagnostics be carried out using linear brake pedal travel measurements, which is why the prior art has heretofore been limited to locating brake pedal travel measurement devices to being located directly in-line with the brake pedal plate.

Therefore, another aspect of the invention is to provide a methodology for converting the non-linear travel measurements provided by the potentiometers 230a, 230b, 230c to linear brake pedal travel measurements that are usable in connection with the process of evaluating the performance of a given vehicle's braking system and/or for benchmarking a particular vehicle's braking system. To that end, FIG. 3 depicts a side view of the two-string potentiometer arrangement of FIG. 2A in which the two strings S1, S2 connect potentiometers 230a and 230b to substantially the same point (e.g., point 250) on the brake pedal lever 10. As shown, potentiometers 230a and 230b are located some known distance k apart from each other.

Figure 4A:
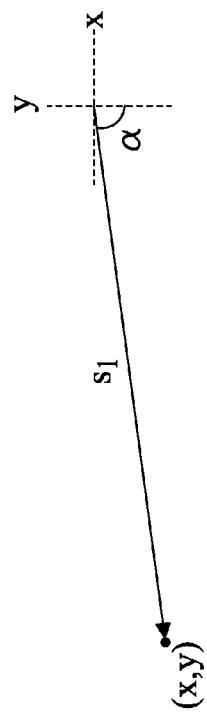
FIGS. 4A-4D illustrate various geometric relationships corresponding to the strings of a two-string embodiment of the present invention.

With respect to converting the non-linear travel measurements provided by the two potentiometers 230a, 230b to linear brake pedal travel measurements, the novel approach disclosed herein begins with the trigonometric relationship between strings $S_1$ and $S_2$. Specifically, the geometric relationship between $S_1$ and $S_2$ can be represented as a triangle, as shown in FIG. 4A, where k is the distance between the two potentiometers 230a, 230b and the point at which S1 and S2 meet is the point at which the potentiometer strings engage the brake pedal lever 10, i.e., point 250. Thus, it follows that the angle ($\alpha$) between $S_1$ and k can be represented as:

$$s_2^2 = s_1^2 + k^2 - 2ks_1 \cos \alpha, \quad (1)$$

Figure 4B:
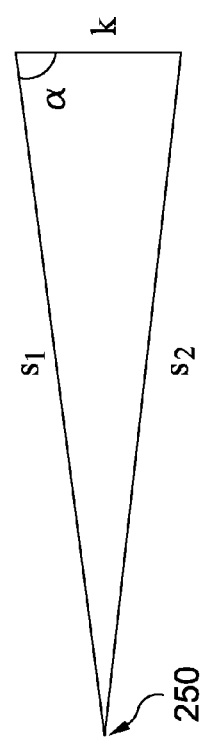

A vector representation of side $S_1$ with orthogonal x,y coordinate axis can be established at vertex of $S_1$ and k, shown in FIG. 4B. The $S_1$ vector may then be broken into x,y-components to yield the x,y coordinates of the $S_1$ termination point (point 250) in 2D-space using the following relationships:

$$x_1 = s_1 \sin \alpha \quad (2)$$

$$y_1 = s_1 \cos \alpha \quad (3)$$

Figure 4C:
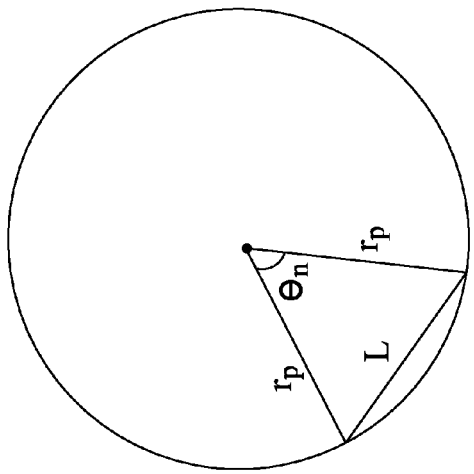

With any three $\{x_n, y_n\}$, a system of equations of an imaginary circle defining the trajectory circle of the $S_1$ string attachment point on the pedal can be provided, where the imaginary circle is defined by an imaginary radius ($r_i$) having an imaginary center (a,b), as shown in FIG. 4C. In particular, for any point $x_n$, $y_n$ along the imaginary circle of FIG. 4C, the following holds true:

$$r_i^2 = (x_n - a)^2 + (y_n - b)^2 \quad (4)$$

Using Equation (4), the following system of equations can be used to solve for a, b and $r_i$:

$$\begin{bmatrix} (x_1 - a)^2 & (y_1 - b)^2 & r_i^2 \\ (x_2 - a)^2 & (y_2 - b)^2 & r_i^2 \\ (x_3 - a)^2 & (y_3 - b)^2 & r_i^2 \end{bmatrix} \rightarrow (a, b), r_i \quad (5)$$

Once $r_i$ is known, it can be used to convert $x_n$ or $y_n$ to $\theta$ (angle displaced) via rectangular-to-polar methods:

$$x_n = r_i \cos \theta \rightarrow \theta_n \quad (6)$$

$$y_n = r_i \sin \theta \rightarrow \theta_n \quad (7)$$

Figure 4D:
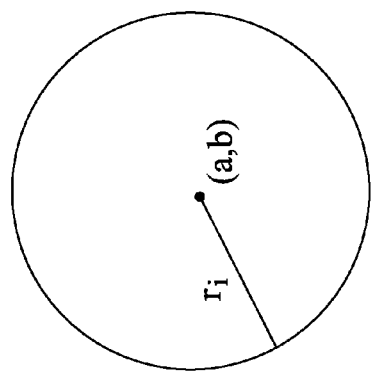

Once $\theta_n$ is known, the linear distance traveled by the pedal (L), between start position ($\theta_0$) and any $\theta_n$, may be found using Equations (8)-(10) for the chord length and the actual pedal radius ($r_p$), as measured from the pivot point (a, b) to the point along the brake pedal lever for which the linear travel is desired—this point is usually the center of the pedal pad. This is graphically shown in FIG. 4D.

$$crd\theta_n = 2\sin\left(\frac{\theta_n}{2}\right) \quad (8)$$

$$L = r_p crd\theta_n \quad (9)$$

$$L = 2r_p \sin\left(\frac{\theta_n}{2}\right) \quad (10)$$

Figure 5A:
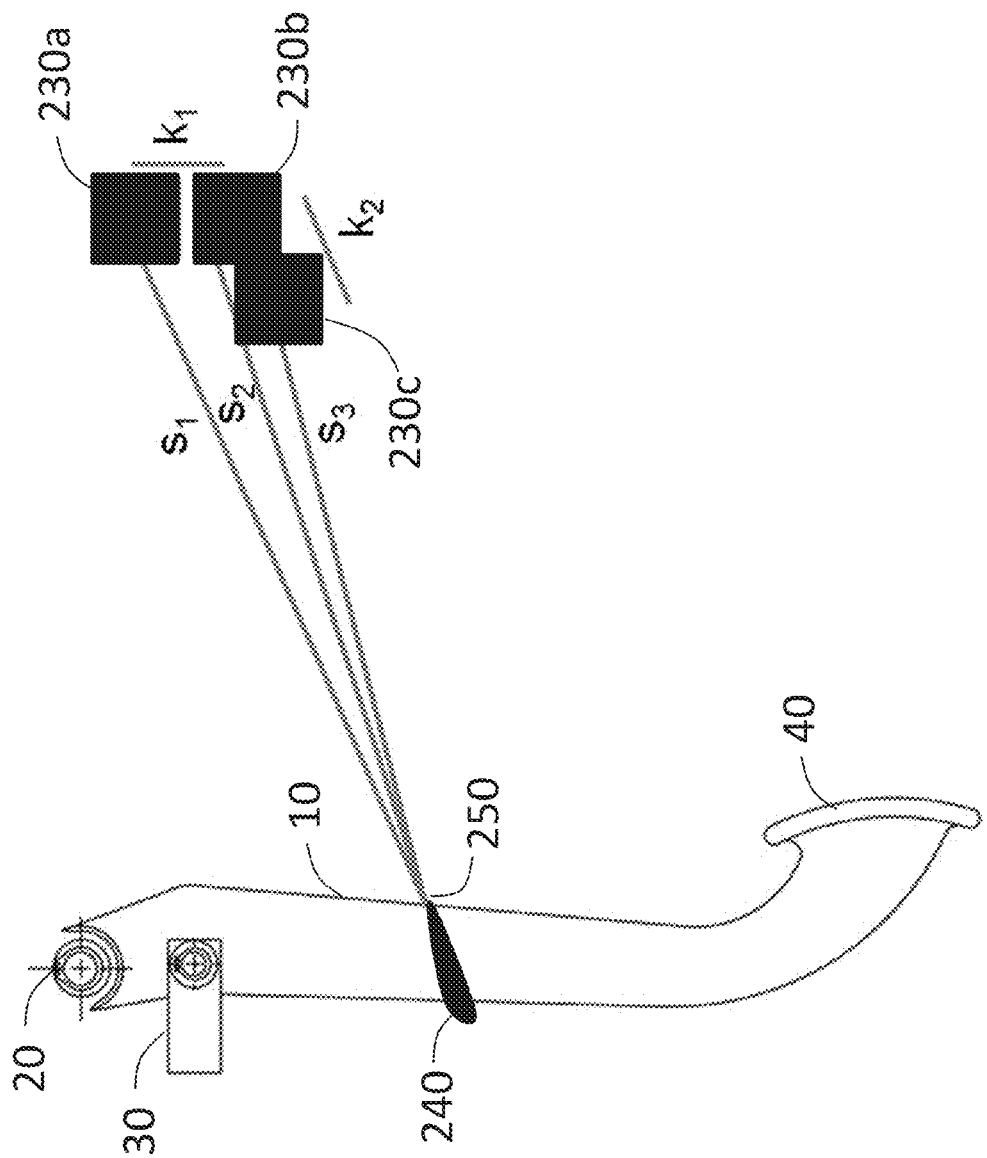
FIG. 5A-5B depicts additional views of the three-string embodiment of FIG. 2B.

Referring now to FIG. 5A, depicted a side view of the three-string potentiometer arrangement of FIG. 2B in which the three strings S1, S2, S3 connect potentiometers 230a, 230b, 230c to substantially the same point on the brake pedal lever 10. As shown, potentiometers 230a and 230b are located some known distance $k_1$ apart from each other, while potentiometers 230b and 230c are located some second known distance $k_2$ apart from each other.

Figure 5B:
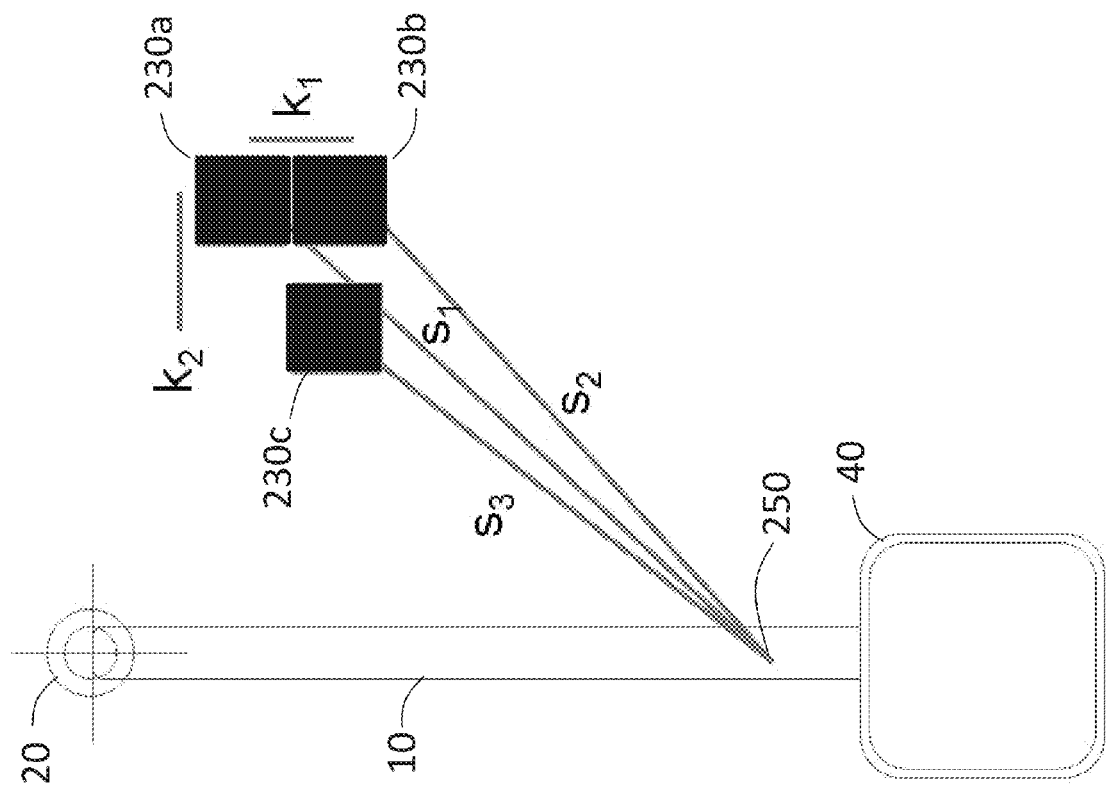

Addition, FIG. 5B depicts a top view of the three-string potentiometer arrangements of FIGS. 2B and 5A. As can be additionally seen in the view of FIG. 3C, the potentiometers 230a, 230b, 230c may be arranged in an offset and otherwise unrestricted manner with respect to the actual brake pedal, thereby providing unobstructed access to the brake and other pedals in order to facilitate brake pedal measurements.

Figure 6C:
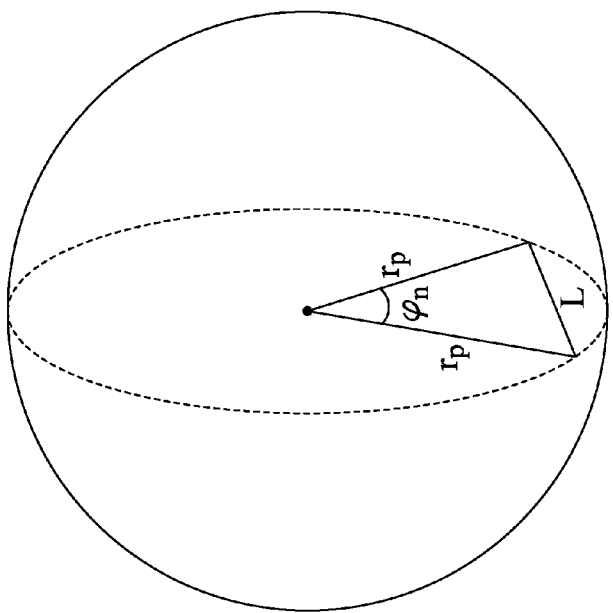
FIGS. 6A-6C illustrate various geometric relationships corresponding to the strings of a three-string embodiment of the present invention.
Figure 6A:
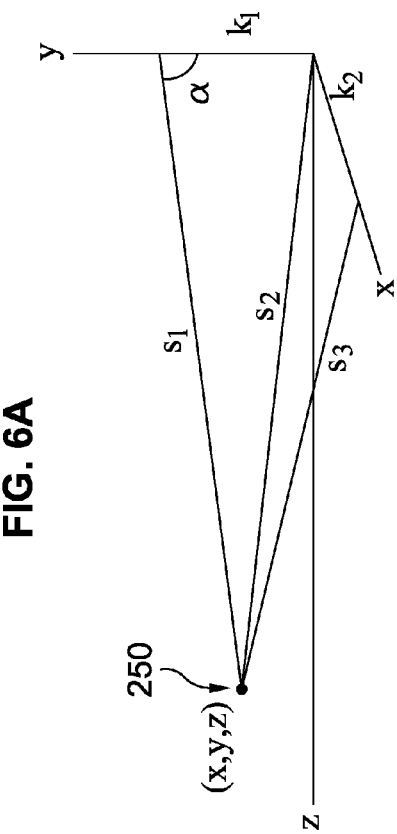

With respect to converting the non-linear travel measurements provided by the three potentiometers 230a, 230b, 230c to linear brake pedal travel measurements, the novel approach disclosed herein begins with the trigonometric relationship between strings $S_1$, $S_2$, $S_3$. Specifically, the relationship between $S_1$, $S_2$, $S_3$ can be represented in three dimensions, as shown in FIG. 6A, where $k_1$ is the distance between two potentiometers (e.g., 230a, 230b) and $k_2$ is the distance between one of those two potentiometers and the third potentiometer (e.g., 230c). In addition, the geometry of FIG. 6A is further defined by the fact that all three strings $S_1$, $S_2$, $S_3$ terminate at the same point, which is the point at which the three potentiometer strings engage the brake pedal lever 10, i.e., point 250.

Figure 6B:
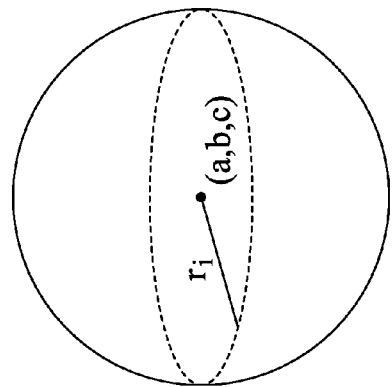

The (x,y,z) point of FIG. 6A can be solved using vector projections of $S_1$, $S_2$, $S_3$ onto the x, y, and z-axes. Specifically, with any four $\{x_n, y_n, z_n\}$ points, a system of equations of an imaginary sphere defining circumferential trajectory circle of the string attachment point on the can be provided, where the circumferential trajectory circle is defined by an imaginary radius ($r_i$) having an imaginary center (a, b, c), as shown in FIG. 6B. In particular, for any point $x_n$, $y_n$, $z_n$ along the circumferential trajectory circle of FIG. 6B, the following holds true:

$$r_i^2 = (x_n - a)^2 + (y_n - b)^2 + (z_n - c)^2 \quad (11)$$

Using Equation (11), the following system of equations can be used to solve for a, b, c and $r_i$:

$$\begin{bmatrix} (x_1 - a)^2 & (y_1 - b)^2 & (z_1 - b)^2 & r_i^2 \\ (x_2 - a)^2 & (y_2 - b)^2 & (z_2 - b)^2 & r_i^2 \\ (x_3 - a)^2 & (y_3 - b)^2 & (z_3 - b)^2 & r_i^2 \\ (x_4 - a)^2 & (y_4 - b)^2 & (z_4 - b)^2 & r_i^2 \end{bmatrix} \rightarrow (a, b, c), r_i \quad (12)$$

Once $r_i$ is known, it can be used to convert $x_n$, $y_n$, and $z_n$ to r, θ, and φ (respectively) via the following rectangular-to-spherical methods:

$$r = \sqrt{x^2 + y^2 + z^2} \quad (13)$$

$$\theta = \tan^{-1}\left(\frac{y}{x}\right) \quad (14)$$

$$\varphi = \cos^{-1}\left(\frac{z}{r}\right) \quad (15)$$

Once $\phi_n$ is known, the linear distance traveled by the pedal (L), between start position ($\phi_0$) and any $\phi_n$, may be found using Equations (16)-(18) for the chord length and the actual pedal radius ($r_p$), as measured from the pivot point (a, b, c) to the point along the brake pedal lever for which the linear travel is desired—this point is usually the center of the pedal pad. This is graphically shown in FIG. 6C.

$$crd\varphi_n = 2\sin\left(\frac{\varphi_n}{2}\right) \quad (16)$$

$$L = r_p crd\varphi_n \quad (17)$$

$$L = 2r_p \sin\left(\frac{\varphi_n}{2}\right) \quad (18)$$

Figure 7:
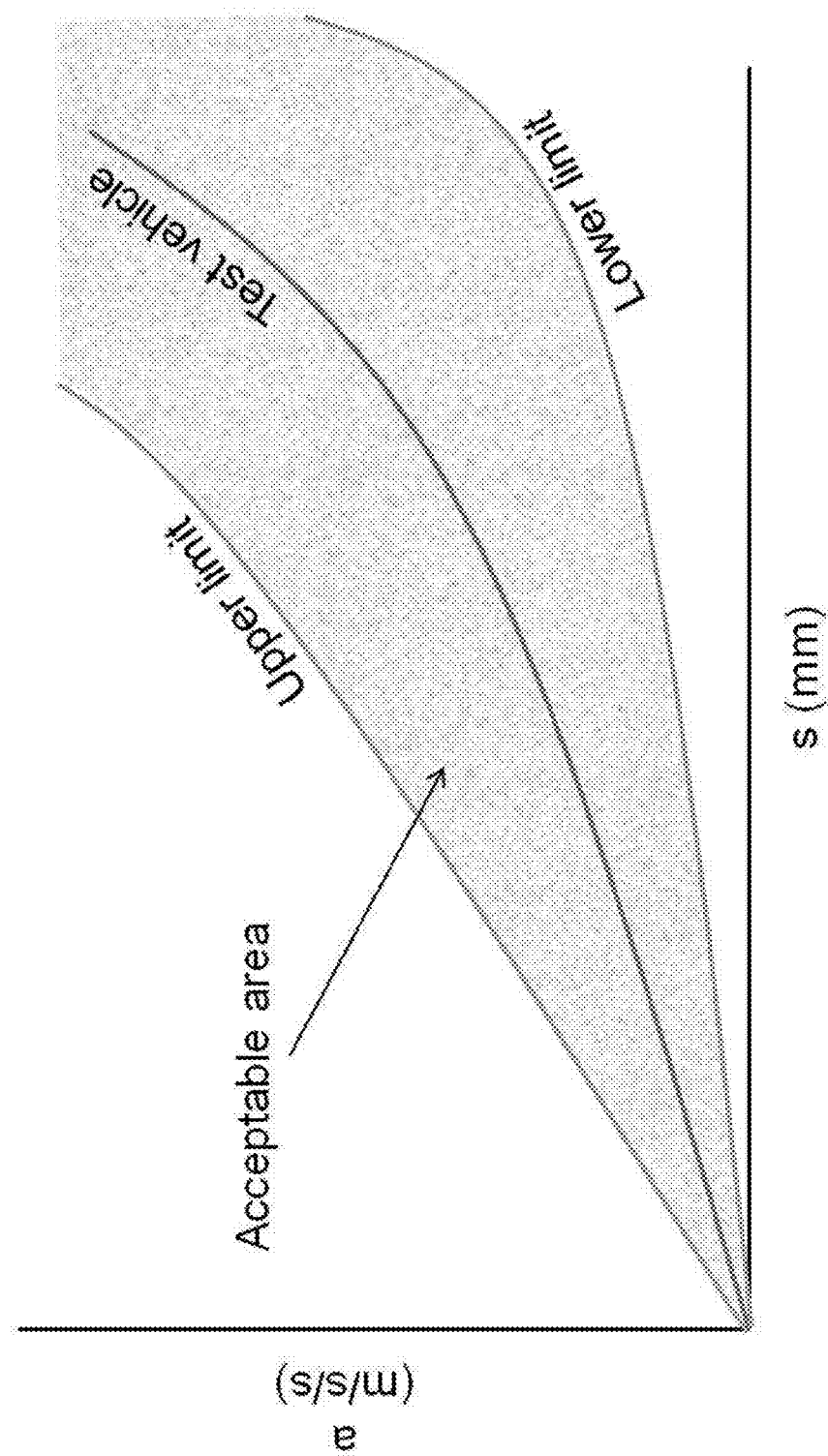
FIG. 7 depicts one embodiment of a graph of linear pedal travel versus vehicle deceleration.

Once the linear brake pedal travel measurements have been determined using the above teachings, the individual linear travel measurements may be plotted as a function of vehicle deceleration. The resulting graph may be displayed on a display screen of the diagnostic unit (or associated with the diagnostic unit), and used to determine if the brake pedal is traveling within an acceptable range based on the vehicle's specifications, as shown for example in FIG. 7.

Referring now to FIG. 8, what is depicted is a simplified flow diagram for a process of carrying out one or more aspects of the invention. In particular, process 800 begins at block 810 with the attachment of two or three string potentiometers (e.g., potentiometers 230a, 230b, 230c) to a brake pedal lever, such as the brake pedal lever 10 described above. As described above, the individual strings of the potentiometers may be attached to the brake pedal lever using any known means for attachment, so long as the potentiometer strings terminate in substantially the same point along the brake pedal lever.

Once the string potentiometers are in place, process 800 may continue to block 820 where the brake pedal is operated from an initial position to some operating position along a plane of rotation. The resulting non-linear pedal travel is measured by the string potentiometers, resulting in an output signal being provided by each of the two or three string potentiometers representative of the amount or degree of extension experienced by each such string potentiometers (block 830). In certain embodiments, the output signals may be provided by the two or three string potentiometers to a processor, such as processor 210 described above.

Once the non-linear pedal travel measurements have been provided by the two or three string potentiometers, process 800 may then continue to block 840 where the non-linear measurements may be converted into corresponding linear brake pedal travel measurements, such as by a processor executing program code stored in memory, by applying either the two-string or the three-string mathematical equations and calculations, as specifically detailed above, to the non-linear brake pedal travel data in order to compute the corresponding linear travel measurement information.

Once the linear brake pedal travel information has been computed, the process 800 may then continue to either block 850 or 860, depending on the particular goal. For example, in the event the particular vehicle's brake pedal performance is to be evaluated, process 800 may continue to block 850 where the calculated linear pedal travel from block 840 may be graphed against vehicle deceleration and displayed on a display screen of the diagnostic unit (or associated with the diagnostic unit) so that the resulting plot can be evaluated to see if the brake pedal performance falls within an acceptable range based on the vehicle's specifications, as was previously described with respect to FIG. 7. If, on the other hand, there is a desire to benchmark a particular vehicle (or type of vehicle) against one or more other vehicles (or types of vehicles), then the calculated linear pedal travel from block 840 may be again graphed against the vehicle's experienced deceleration, while the resulting plot is then compared (e.g., by the diagnostic unit), to one or more corresponding plots from other vehicles, and a further benchmarking result may be provided that is a qualitative representation of the particular vehicle's brake pedal performance against one or more reference vehicles.

While the above has the sensor arrangement of the invention in terms of string potentiometers, including either a two or three string arrangement, as previous noted the principles of the invention may be applied to other kinds of sensors or sensor arrangements as well, such as linear potentiometers, laser distance sensors, Hall Effect sensors, ultrasonic distance sensors, etc. Such systems may be configured in the same manner as the diagnostic unit 200 of FIGS. 2A-2B, as described above, except that the potentiometers 230a, 230b, 230c may be replaced with other types of sensors that are configured to register movement of a brake pedal lever 10. Moreover, as with the placement of the string potentiometers 230a, 230b, 230c, such sensors may also preferably be offset from the face of the pedal plate and otherwise outside of the plane of pedal rotation, thereby similarly achieving the benefit of the invention by providing unobstructed access to the brake and other pedals in order to facilitate brake pedal measurements.

While the invention has been described in connection with various embodiments, it should be understood that the invention is capable of further modifications. This application is intended to cover any variations, uses or adaptation of the invention following, in general, the principles of the invention, and including such departures from the present disclosure as come within the known and customary practice within the art to which the invention pertains.

What is claimed is:

1. A system for measurement and evaluation of brake pedal performance for a vehicle comprising:
   a diagnostic unit having a processor coupled to a memory; and
   at least two linear measurement devices in electrical communication with the diagnostic unit, wherein the at least two linear measurement devices are offset in at least a vertical direction from a face of the brake pedal lever,
   wherein the at least two linear measurement devices are each configured to provide, in response to an operation of the brake pedal lever from an initial position to a first operated position, a signal corresponding to a non-linear pedal travel measurement of the brake pedal lever resulting from said operation, and wherein the processor is configured to convert the non-linear pedal travel measurements received from each of the at least two linear measurement devices to a linear brake pedal travel value corresponding to the first operated position.

2. The system of claim 1, wherein the at least two linear measurement devices comprises three linear measurement devices, and wherein the three linear measurement devices are offset in both a horizontal and the vertical direction from the face of the brake pedal lever.

3. The system of claim 1, wherein the at least two linear measurement devices comprise at least two string potentiometers, wherein each potentiometer is coupled to a brake pedal lever of the vehicle using a corresponding string extending from each of the respective potentiometers to a common point of termination in a vicinity of the brake pedal lever.

4. The system of claim 3, wherein the at least two string potentiometers are configured to engage the brake pedal lever at the common point of termination using a connector.

5. The system of claim 1, wherein each of the at least two linear measurement devices are further configured to provide, in response to operation of the brake pedal lever from the initial position to a plurality of operated position, signals corresponding to a plurality of non-linear pedal travel measurements of the brake pedal lever at each of the plurality of operated positions.

6. The system of claim 5, wherein the processor is further configured to convert the plurality of non-linear pedal travel measurements received from the at least two linear measurement devices to a plurality of linear brake pedal travel values corresponding to the plurality of operated positions.

7. The system of claim 6, wherein the diagnostic unit is further configured to:
receive, for each of the plurality of operated positions, at least one of a plurality of vehicle decelerations values, a plurality of driver-applied brake pedal forces and a plurality of brake line pressures; and
display a plot of the plurality of linear brake pedal travel values against the received at least one of the plurality of vehicle decelerations, the plurality of driver-applied brake pedal forces and the plurality of brake line pressures.

8. The system of claim 1, wherein the system comprises two linear measurement devices, and wherein the processor is further configured to convert the non-linear pedal travel measurements received from each of the two linear measurement devices to the linear brake pedal travel value corresponding to the first operated position by determining a two-dimensional pivot point and a pedal radius for the brake pedal lever.

9. The system of claim 1, wherein the system comprises three linear measurement devices, and wherein the processor is further configured to convert the non-linear pedal travel measurements received from each of the three linear measurement devices to the linear brake pedal travel value corresponding to the first operated position by determining a three-dimensional pivot point and a radius for the brake pedal lever.

10. A method for measurement and evaluation of brake pedal performance for a vehicle comprising:
mounting at least two linear measurement devices inside a vehicle, wherein the at least two linear measurement devices are in electrical communication with a diagnostic unit;
arranging the at least two linear measurement devices in an offset orientation with respect to at least a vertical direction from a face of the brake pedal lever;
providing, by each of the at least two linear measurement devices to the diagnostic unit, a signal corresponding to a non-linear pedal travel measurement of the brake pedal lever resulting from an operation of the brake pedal lever from an initial position to a first operated position; and
converting, by the diagnostic unit, the non-linear pedal travel measurements received from each of the at least two linear measurement devices to a linear brake pedal travel value corresponding to the first operated position.

11. The method of claim 10, wherein the at least two linear measurement devices comprises three linear measurement devices, and wherein the three linear measurement devices are offset in both a horizontal and the vertical direction from the face of the brake pedal lever.

12. The method of claim 10, wherein the at least two linear measurement devices comprise at least two string potentiometers, and wherein the method further comprises coupling the brake pedal lever to each of the at least two string potentiometers using a corresponding string extending from each of the respective potentiometers to a common point of termination in a vicinity of the brake pedal lever.

13. The method of claim 10, further comprising providing, by each of the at least two linear measurement devices to the diagnostic unit, signals corresponding to a plurality of non-linear pedal travel measurements of the brake pedal lever corresponding to each of a plurality of operated positions.

14. The method of claim 13, further comprising converting, by the diagnostic unit, the plurality of non-linear pedal travel measurements received from the at least two linear measurement devices to a plurality of linear brake pedal travel values corresponding to the plurality of operated positions.

15. The method of claim 14, further comprising:
receiving, by the diagnostic unit and for each of the plurality of operated positions, at least one of a plurality of vehicle decelerations values, a plurality of driver-applied brake pedal forces and a plurality of brake line pressures; and
displaying, by the diagnostic unit, a plot of the plurality of linear brake pedal travel values against the received at least one of the plurality of vehicle decelerations, the plurality of driver-applied brake pedal forces and the plurality of brake line pressures.

16. The method of claim 10, wherein mounting comprises mounting two linear measurement devices to the vehicle, and wherein the method further comprises converting, by the diagnostic unit, the non-linear pedal travel measurements received from the two linear measurement devices to the linear brake pedal travel value corresponding to the first operated position by determining a two-dimensional pivot point and a pedal radius for the brake pedal lever.

17. The method of claim 10, wherein mounting comprises mounting three linear measurement devices to the vehicle, and wherein the method further comprises converting the non-linear pedal travel measurements received from each of the three linear measurement devices to the linear brake pedal travel value corresponding to the first operated position by determining a three-dimensional pivot point and a radius for the brake pedal lever.

18. A system for measurement and evaluation of brake pedal performance for a vehicle comprising:

a diagnostic unit having a processor coupled to a memory; and at least two string potentiometers in electrical communication with the diagnostic unit, wherein each potentiometer is coupled to a brake pedal lever of the vehicle using a corresponding string extending from each of the respective potentiometers to a common point of termination in a vicinity of the brake pedal lever, wherein the at least two string potentiometers are offset in at least a vertical direction from a face of the brake pedal lever, wherein the at least two string potentiometers are each configured to provide, in response to an operation of the brake pedal lever from an initial position to a first operated position, a signal corresponding to a non-linear pedal travel measurement of the brake pedal lever resulting from said operation, and wherein the processor is configured to convert the non-linear pedal travel measurements received from each of the at least two string potentiometers to a linear brake pedal travel value corresponding to the first operated position.

19. The system of claim 18, wherein the at least two string potentiometers comprises three string potentiometers, and wherein the three string potentiometers are offset in both a horizontal and the vertical direction from the face of the brake pedal lever.

20. The system of claim 1, wherein the at least two string potentiometers are configured to engage the brake pedal lever at the common point of termination using a connector.

* * * * *